Jan. 20, 1970     R. H. LARSON     3,490,474
FLUID VALVE
Filed June 10, 1966     2 Sheets-Sheet 1
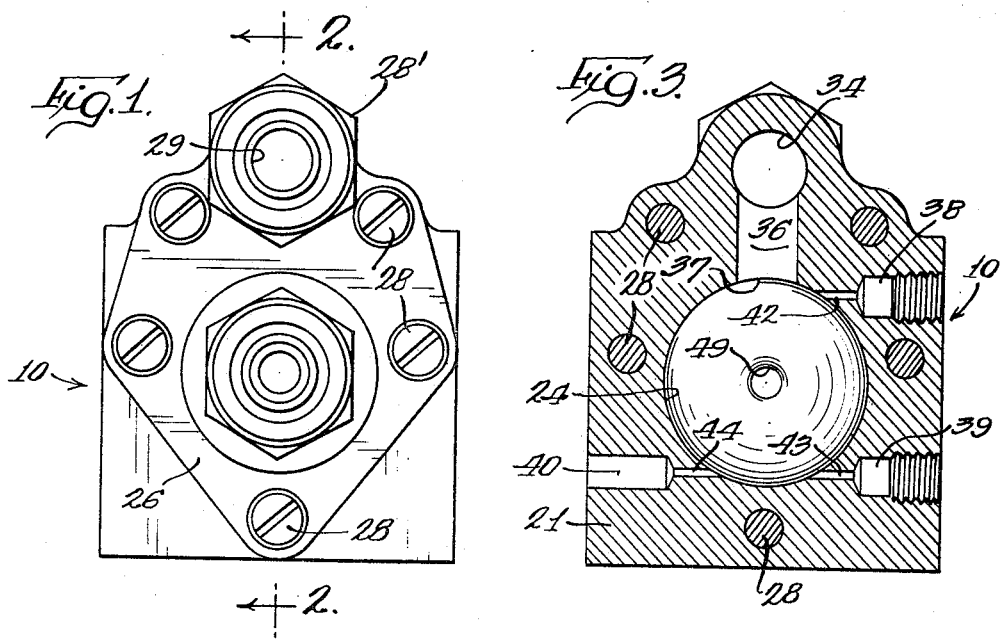
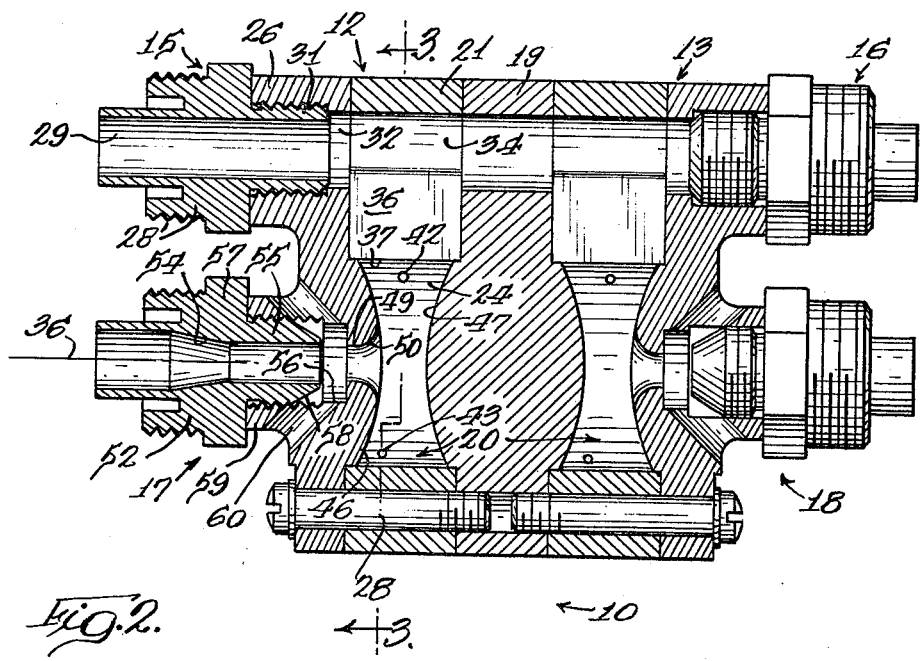
Inventor:
Ralph H. Larson
By Hofgren, Wegner,
Allen, Stellman & McCord
Attys Jan. 20, 1970  R. H. LARSON  3,490,474
FLUID VALVE
Filed June 10, 1966  2 Sheets-Sheet 2

United States Patent Office 3,490,474
Patented Jan. 20, 1970

3,490,474
FLUID VALVE
Ralph H. Larson, Wilmette, Ill., assignor, by mesne assignments to I-T-E Imperial Corporation, Philadelphia, Pa., a corporation of Delaware
Filed June 10, 1966, Ser. No. 556,746
Int. Cl. F15c *1/14*
U.S. Cl. 137—81.5
23 Claims

ABSTRACT OF THE DISCLOSURE

A fluidic vortex device for modulating fluid flow, having a body with a generally annular vortex chamber, a supply port at the periphery of the chamber for supplying a major portion of the fluid to the chamber, an outlet port disposed centrally in the chamber for conveying fluid therefrom, and a control port in the body disposed tangentially with respect to the chamber so that when fluid is supplied thereto a fluid vortex will be created in the chamber, there being provided convex sidewalls in the chamber so that the width of the chamber decreases towards the outlet port.

---

This invention relates generally to fluid devices and more particularly to pure fluidic devices which require no moving parts for operation, and more specifically to devices of this character commonly referred to as vortex valves.

A vortex valve is essentially a variable restrictor which achieves resistance to flow by means of a constrained vortex. The main parts of a valve of this type are a generally cylindrical vortex chamber, a supply port, a control port or ports, and an outlet port. Primary flow is admitted through the supply port, while secondary or control flow is admitted through the control ports which are conventionally disposed tangentially with respect to the vortex chamber. A relatively low level control flow is used to generate a vortex in the vortex chamber and thereby restrict and reduce the primary flow.

When no control flow is present, the outlet flow rate is determined solely by the exit or outlet orifice area and the system pressures. This is the vortex-off or non-vortex state. In this state then, the pressure throughout the vortex chamber is constant and equal to the supply pressure. When control flow is injected into the vortex chamber, a vortex is generated which reduces the outlet flow rate. This is the vortex state or vortex-on condition. The flow reduction is the result of the radial pressure gradient which exists in the vortex, decreasing from the periphery of the vortex chamber to the outlet port or orifice which is disposed in the center of the vortex chamber. A stronger vortex produces a steeper pressure gradient and, therefore, less outlet flow.

Viewing the fluid mechanics of the vortex phenomena in somewhat more detail reveals the basic reason for its performance. At the periphery of the vortex chamber, the relatively high velocity control flow mixes with the low velocity supply flow to create a net tangential velocity. The combined fluids thus spiral toward the outlet port. As the angular momentum of the fluids must be conserved, the tangential velocity of the fluids must increase as the radius decreases. Now, since the pressure in a fluid stream decreases as the velocity of the fluid increases, the pressure in the vortex chamber decreases as the radius decreases.

As a flow modulator, the basic vortex device has a negative gain, since an increase in the vortex generating control flow results in a reduction in the net outlet flow. Vortex valves of the non-vented type will modulate flow from full output down to ten to twenty percent thereof.

In addition to modulating flow, a vortex valve can also modulate power. The same basic device as that used for flow control is employed except that a venting scheme is used to make the vortex chamber insensitive to load back pressure. In this manner vortex power valves may be provided which can handle any power level required. Because of the vent, the output power can be modulated from full output to zero output. A further feature of these vortex valves is that positive and negative control input ports may be provided so that the device becomes a summing junction as well as a valve and permits a negative bias to be applied thereto so that the flow gain is positive.

The applications for valves of this type appear to be unlimited in the control of flow of liquids and gases. Exemplary applications are for flow control in chemical processing, oil refining, food processing, natural gas systems, engine fuel control, and boiler control. These valves can also be used in hydraulic and pneumatic systems as power stages for driving cylinders and motors, and further can be used for piloting conventional directional control valves.

Referring in more detail to the general use of devices of this character, and initially to their use as flow modulators, an increase in the control flow produces a decrease in the outlet flow, thus, providing a flow amplifier with a negative gain. The gain is not constant over the complete operating range, but in accordance with the present invention can be made to be relatively constant over a large portion of the range. In non-vented flow modulators of this type the outlet flow may be reduced significantly but can never reach zero. The relationship between maximum flow and minimum flow is referred to as the turn down ratio. The minimum outlet flow occurs at the point where the supply flow into the vortex chamber is reduced to zero, and here the output flow rate is equal to the control flow rate.

The operation of these devices as flow amplifiers may be improved with respect to the degree of flow modulation, through the use of a vented outlet. These vents may be provided between the outlet and a receiver member which is spaced a distance from the outlet port of the vortex chamber. With this improvement the flow out of the receiver tube can be completely reduced to zero and even reversed in direction. When a strong vortex is generated the outlet flow completely misses the receiver passing into the vents and may even aspirate flow from the receiver.

When used as a power modulator, the vents described immediately above permit the output or load to have an unlimited impedance without affecting the vortex in the chamber, which is an imperative feature for efficient power modulation.

The device will operate as a pressure amplifier when the receiver, in the vented type described above, is loaded with a high impedance. The output pressure then is generated in the receiver tube.

Although there has been considerable experimental activity in recent years with pure fluidic vortex devices and in fluidic devices in general, heretofore attempts to optimize the port configurations, vortex chamber shape, and design parameter ratios have to a large extent been unsuccessful due to a significant lack in correlation between approximate theoretical calculation and actual operational performance.

In accordance with one aspect of the present invention, the side walls of the vortex chamber have been provided with a convex profile so that the length of the vortex chamber decreases as the center of the chamber is approached. This unique configuration does provide improved performance and has been observed to reduce hysteresis and increase the range of flow modulation of the device.

Further, in accordance with the present invention a receiver fitting is provided, constructed for use in the vented type of vortex device, which is spaced from the outlet orifice and designed to provide maximum flow recovery without requiring excessively high control fluid pressures.

Furthermore, prior attempts have been made to optimize the critical parameter ratios in vortex devices, but such attempts have not been successful in most instances due in part to the lack of correlation between theoretical data and practical results. In the present device, the critical ratios have been determined and produce a valve construction having optimized performance characteristics.

It is, therefore, a primary object of the present invention to provide a new and improved fluidic device without moving parts having improved performance over prior art devices.

It is another object of the present invention to provide a new and improved fluidic device of the vortex type in which the vortex chamber has spherical convex walls which serve to reduce hysteresis and increase the range of flow modulation.

A further object of the present invention is to provide a new and improved vortex device with a venting and receiver arrangement constructed to optimize the degree of flow modulation. This arrangement also permits the use of the device as a power modulator and as a pressure amplifier.

Another object of the present invention is to provide a new and improved fluidic device of the vortex type with a unique supply port configuration that minimizes the tendency of the supply port to create a vortex in the vortex chamber.

It is still another object of the present invention to provide a new and improved vortex device of the type described above in which the critical ratios of the various parameters such as the area of the outlet orifice, the area of the control orifice, the area of the supply port, the diameter of the vortex chamber, the diameter of the outlet orifice, the diameter of the receiver tube, the length of the vortex chamber, the length of the outlet orifice, the radius of the converging section of the outlet orifice, the radius of curvature of the vortex chamber side walls, the displacement of the receiver tube from the outlet orifice, and a cone angle on the end of the receiver tube are critically optimized to improve the performance of the device. The ratios of certain of these parameters have been determined to have a profound and sometimes critical effect on the operation of the vortex device.

Another object of the present invention is to provide a new and improved vortex device of the type described which may be readily converted from a vented to a non-vented type, and back again as desired.

A further object of the present invention is to provide a new and improved fluidic unit, of easy manufacture, which houses two vortex valves of the type described so arranged that it may be used as a phasing control for a double acting load in a manner similar to a hydraulic servo-valve.

Other objects and advantages will be apparent from the following detailed description taken in connection with the accompanying drawings in which:

FIG. 1 is a side elevation of the present vortex device;

FIG. 2 is a cross section taken generally along line 2—2 of FIG. 1, showing the two vortex chambers with the associated porting;

FIG. 3 is a cross section taken generally along line 3—3 of FIG. 1, showing one vortex chamber with the relationship between inlet and control ports;

Figure 7:
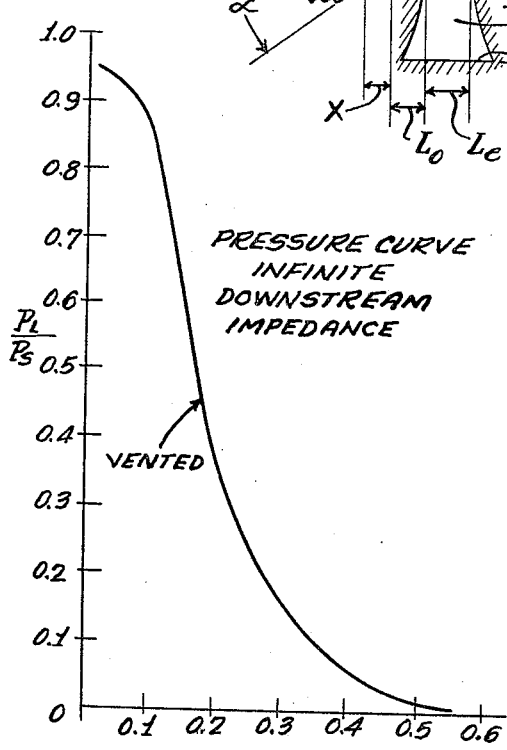
Figure 8:
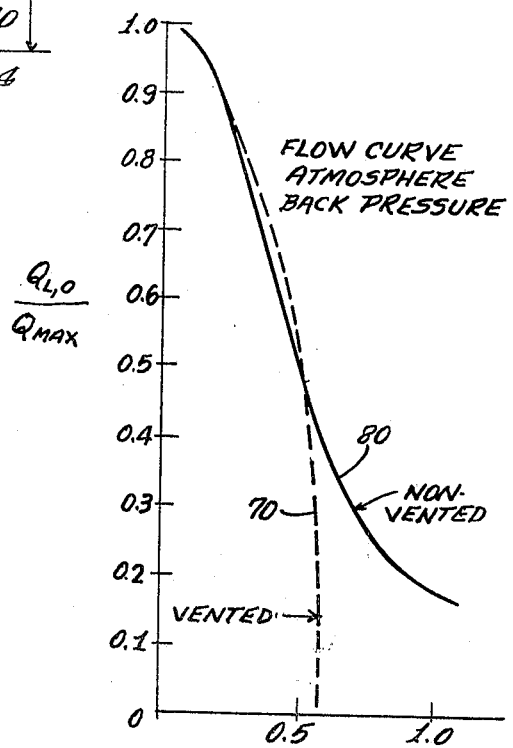

FIG. 7 is a graph showing the performance of the device of FIGS. 1 to 4 as a pressure amplifier with a function of load pressure on the vertical axis and a function of control pressure on the horizontal axis; and FIG. 8 is a graph showing the performance characteristics of the present device as a flow modulator with and without venting, a function of the output or load flow being on the vertical axis and a function of control pressure on the horizontal axis.

Referring now to the construction of the present device, and particularly as shown in FIGS. 1 to 4, a vortex device generally indicated by the numeral 10 is seen to consist generally of two vortex valves 12 and 13, having supply ports 15 and 16 and outlet assemblies 17 and 18, respectively. The device 10 includes a central plate 19 which defines one of the side walls in each vortex chamber 20. Central plate 19 receives intermediate plates 21 each having a cylindrical bore completely therethrough defining the peripheral wall 24 of the vortex chambers 20.

Sandwiching the intermediate plates 21 and central plate 19 are end plates 26 which define the other side walls of the vortex chambers 20. Suitable threaded fasteners 28 extend through the end plates 26, the intermediate plates 21, and are threaded into the central plate 19 to provide a rigid assembly of these parts.

As both of the vortex valves 12 and 13 are identical in construction, reference will hereinafter be made to the details of the valve 12 with the understanding that the construction is applicable to the valve 13 as well.

The supply port assembly 15 is adapted to be connected to a suitable source of either gas or liquid under pressure, for supplying fluid radially into the vortex chamber 20. The supply flow passages are constructed so as to direct a supply fluid into the chamber 20 with a uniform and low velocity profile. In so doing, the supply inlet to the chamber 20 generates no vortex of its own nor does it impede the generation of a vortex by the control flow described below.

The supply port assembly 15 includes a fitting member 28' with a through bore 29 therein, and a threaded reduced portion 31 received in a threaded bore 32 in the end plate 26. Bore 32 is aligned with a bore 34 of the same size in the intermediate plate 21. The bores 29, 32, and 34 lie on an axis parallel to the axis of revolution 36 of the vortex chamber 20, and thereby define an axial inlet portion of the supply port 15. Communicating with bore 34 is a radially extending slot 36 in the intermediate plate 21, which opens to the vortex chamber 20 defining a supply port opening 37 as shown more clearly in FIG. 3. The opening 37 has a length, as shown in FIG. 2, substantially equal to the width of the vortex chamber 20 at its periphery. The width of the supply opening 37, shown in FIG. 3, is sufficient to make the cross sectional area large compared to the net area of the outlet orifice or nozzle, described below. The radial slot 36 has a height greater than the axial length of the slot, as shown in FIG. 2, to assist in eliminating hysteresis and the effects of machining accuracies on the performance of the device from one unit to another.

As shown in FIG. 3, control ports 38, 39 and 40 are provided for supplying control fluid tangentially to the vortex chamber 20. The control ports receive suitable fittings which are connected to a source of control fluid, (not shown), which may be regulated up to a pressure about twice the pressure of the supply fluid delivered to supply port assembly 15. The operation of the vortex device requires a control fluid pressure in excess of the supply fluid pressure, e.g. 50 percent or 100 percent greater.

The control ports 38, 39 and 40 have passages 42, 43, and 44 intersecting the cylindrical surface 24 in the vortex chamber and tangentially disposed with respect to a circle slightly smaller than the cylindrical opening 24. Control flow in ports 38 and 40 tend to create a vortex in a counterclockwise direction as shown in FIG. 3, while control flow in port 39 tends to create a vortex in a clockwise direction in chamber 20 opposing the control flow from ports 38 and 40. This permits the vortex device to be used to add and subtract the input signals from the control ports and amplify the net input. When so used, one of the control ports would be used for each input. Addition occurs when two or more input signals are applied to the vortex chamber in the same tangential direction, and subtraction occurs when the input singals are opposed. In this device the output can be in the form of pressure, flow, or power which has been modulated in direct proportion to the sum of the control inputs.

Suitable means must be provided in the lines supplying control fluid to the ports 38, 39 and 40 to regulate the flow thereto as it is this regulation that modulates the supply flow through supply port 15, in a manner more fully described below.

The vortex chamber 20 is defined by the cylindrical surface 24 and spherical surfaces 46 and 47 formed respectively on the end plate 26 and the central plate 19. It should be noted that the spherical surfaces 46 and 47 also serve to align the plates 19, 21 and 26. The spherical surfaces form convex side walls in the vortex chamber 20 so that the length of the chamber decreases from the periphery to the axis of revolution 36. These convex walls serve to increase the wall area for a given chamber diameter. The primary functions of the convex walls are to reduce hysteresis in the valve and increase the range of flow modulation. There is evidence that the improvement in modulation range is effected by the curvature of the walls and the increase in the wall area which reduce the effect of viscosity by making it difficult for radial flow to occur in the wall boundary layer.

In theoretical calculations studying the vortex phenomena, the effect of viscosity is usually neglected. However, viscosity plays a very strong roll in the performance of the device and serves to alter the velocity and pressure profiles. The side walls in conventional vortex devices, in conjunction with the fluid viscosity, provide the fluid with an easy avenue for escape from the vortex field. Because the tangential velocity is zero at the walls, no centrifugal force field is present and the fluid can more easily flow radially inward. Consequently, most of the radial flow occurs near the side walls and this weakens the vortex and reduces the generated pressure differential from that of the ideal case. The configuration of walls 46 and 47 is believed to significantly reduce the viscosity effect on the modulation range of the device.

The outlet orifice or opening 49 is disposed centrally with respect to the chamber 20 and axis 36, and is formed in the end plate 26. The outlet or nozzle 49 has a converging portion 50 forming a smooth geometric transition from the convex surface 46 to the minimum nozzle diameter. This increases the flow coefficient of the outlet restriction and therefore permits more flow through the outlet for a given diameter thereof. That is, the converging nozzle increases the maximum output flow in the non-vortex or vortex-off state of the device.

The vortex valve 12 shown in FIG. 2 is of the vented type which permits flow from the outlet to the load to be completely turned off, which is made possible by dumping the flow from the outlet to the vents rather than the load. Furthermore, the linearity of the performance curves of the device are improved and the slope of these performance curves are steepened by the addition of the present vent means. This permits the use of a vortex valve as a power and pressure modulator as the outlet flow can be completely turned off and the performance of the vortex chamber is rendered insensitive to load.

Toward this end, a receiver fitting 52 is provided which is adapted to be connected to the load. Fitting 52 includes a central passage therethrough with a diffuser section 54 assisting in the pressure recovery of the device. A threaded reduced portion 55 is received within a partially threaded bore 56 in end plate 26 of larger diameter than the outlet orifice 49. The outer forward end of the reduced portion 55 has a frusto-conical surface 58 the angle of which affects the flow and pressure recovery in the receiver passage 54 as will appear hereinbelow. Fitting 52 has a flange 57 which abuts a boss 59 on the end plate 26 serving to accurately space the fitting 52 from the outlet orifice 49. The axial spacing affects pressure recovery and modulation.

A plurality of vents are provided defined by passages 60 conically arranged in end plate 26 and intersecting bore 56 between the receiver fitting portion 55 and the outlet orifice 49. Bores or passages 60 communicate with the atmosphere or to a system tank.

In the vortex-off state when no control flow is flowing through ports 38, 39, or 40, the supply flow entering the vortex chamber 20 will jet from the outlet orifice 49 into the receiver 52. The configuration of the fitting 52, and the vents 60 with respect to the outlet orifice 49 permit 100 percent flow recovery, or even more, in the non-vortex state. That is, the flow from the receiver tube 52 will be equal to or even greater than the supply flow to the supply port assembly 15. In the vortex state or vortex-on state, when control flow through one or more of the control ports creates a vortex in chamber 20, the flow through the outlet orifice 49 partakes a conical shape which, if a sufficient vortex strength is present, will completely miss the receiver tube fitting portion 55 and pass out the vents 60. The receiver tube portion 55, vents 60, and the outlet orifice 49 permit a pressure recovery when the receiver tube passage is blocked of about 97 percent, that is, the load pressure would be 97 percent of the supply pressure in supply inlet port 15.

Figure 4:
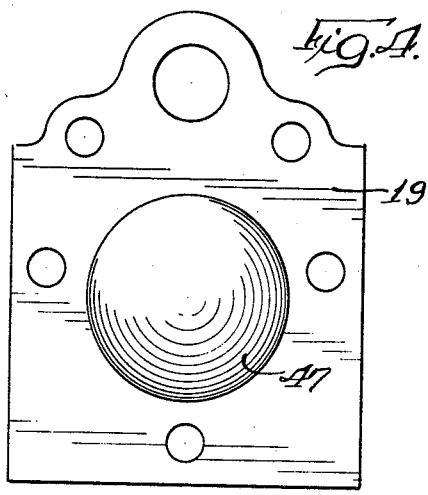
FIG. 4 is a side elevation of the central plate which defines a portion of the two vortex chambers.
Figure 5:
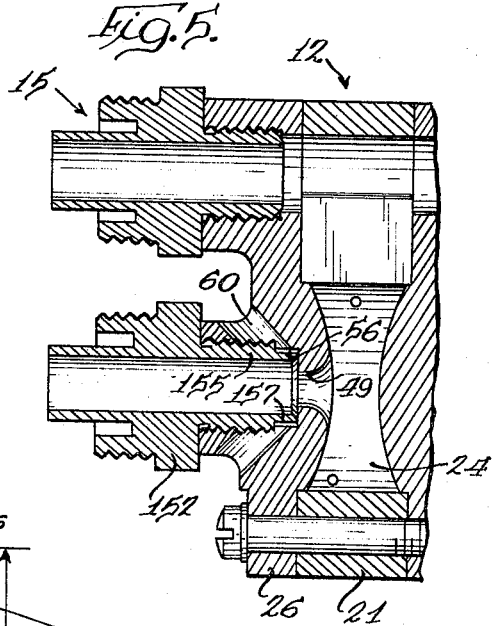
FIG. 5 is a fragmentary section of one of the vortex devices shown in FIG. 2 with a non-vented outlet fitting replacing the vented receiver fitting shown in FIG. 2.

When used as a non-vented flow modulator the receiver fitting 52 may be replaced by an outlet fitting 152 shown in FIG. 5. The outlet fitting 152 serves to close the vent passages 60, thus converting the device to a non-vented vortex valve. A reduced threaded portion 155 is receivable in threaded bore 56 in end plate 26 upon removal of the receiver fitting 52. An annular forward extension 157 engages the end of bore 56 sealing the passages 60 from the outlet orifice 49. With this construction, in both the vortex and the non-vortex state, all of the flow from the outlet 49 enters the outlet fitting 152, which is connectable to the load. In this case flow to the outlet can never be completely turned off, and under maximum control pressure conditions the minimum flow in the output tube 152 may approach 10 percent of the maximum supply flow in port 15.

The operation of the device as shown in FIGS. 1 to 4 as a flow modulator is as follows, assuming an atmospheric load pressure. With supply fluid, e.g., 20 p.s.i.g. being delivered to the supply port 15, this fluid enters the vortex chamber 20 through supply slot 36. As no control flow is supplied to ports 42, 43, or 44, the pressure throughout the vortex chamber is constant and equal to supply pressure. Under these conditions the supply fluid is unrestricted except for the outlet orifice 49 and passes therethrough at a rate determined solely by the area of orifice 49. When control flow is injected into the vortex chamber 20 through one or more of the ports 38, 39 and 40, a vortex is generated in the chamber 20 which reduces the outlet flow rate through orifice 49. This is exemplified by curve 70 in FIG. 8 which plots the flow rate as a function of the control pressure normalized to the maximum flow rate and the supply pressure, respectively. As the control pressure increases, the flow in the receiver tube 52 decreases from its maximum and may be completely reduced to zero and even reversed as the control pressure is increased. The latter reversal occurs when a strong vortex is generated under a high control pressure which in turn produces a hollow, conical flow sheet out of the outlet orifice 49. The outlet flow in this case completely misses the receiver tube and in fact aspirates flow from it, hence the reason for the flow reversal in receiver fitting 52. Note that the linearity of the curve 70 over the non-vented curve 80 is improved and the slope of the curve 70 is also somewhat steeper.

Referring now to FIG. 7, the performance curve for the vented device of FIGS. 1 to 4 as a pressure modulator is shown in which the load or receiver pressure is plotted as a function of the control pressure normalized by the supply pressure. When used as a pressure amplifier the receiver 52 or the load connected thereto would be loaded with a high impedance. The output pressure then is generated in the receiver tube. Note that the load pressure can be reduced from a value substantially equal to supply pressure to zero, or even below, by the increase in control pressure above supply pressure.

The device of FIGS. 1 to 4 may also be used as a power modulator as the vent construction permits the output to be loaded without affecting the vortex. As the receiver pressure is increased in the non-vortex state, the flow rate into the receiver will decrease, following a smooth curve, (not shown).

When the outlet fitting 152 replaces the receiver fitting 52, the device may be operated as a flow modulator with an exemplary performance characteristic indicated by curve 80 in FIG. 8. As with the vented case, the non-vented flow amplifier operates with a negative gain, that is, as control flow increases outlet flow decreases. In the non-vented case the outlet flow may be significantly reduced but it may never reach zero due to the fact that even when the control flow has its maximum restricting effect on the supply flow there will at least be present the control flow in the outlet fitting 152, which occurs when the supply flow is reduced to zero.

Figure 6:
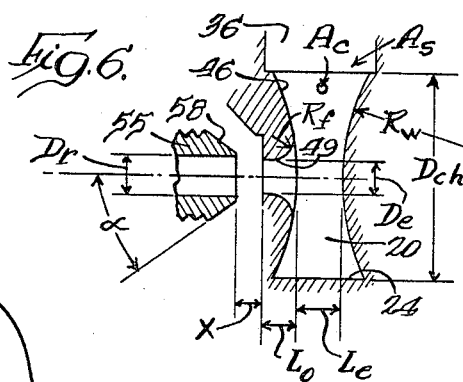
FIG. 6 is a schematic representation of the present vortex valve with representative for the important parameters.

Variations in the dimensional parameters in the vortex valve in both the vented and the non-vented cases have been found to have a significant effect on the performance characteristics of the device. Certain optimum ratios for these parameters have been found to minimize hysteresis, increase the degree of modulation, and increase the linearity characteristics of the present valve. Referring to FIG. 6 wherein the critical parameters are designated by letter references, the following definitions are applied:

$A_e$=Area of outlet orifice
$A_c$=Area of control orifice
$A_s$=Area of supply port
$D_{ch}$=Diameter of vortex chamber
$D_e$=Diameter of outlet orifice
$D_r$=Diameter of receiver tube
$L_e$=Length of vortex chamber at its center
$L_o$=Length of outlet orifice
$R_f$=Radius of converging section of outlet orifice
$R_w$=Radius of curvature of side wall
$X$=Displacement of receiver tube from outlet orifice
$\alpha$=Cone angle of receiver tube The ratio of the area of the supply opening $A_s$ to the area of the outlet orifice $A_e$ has been found to be optimized in the range of 3 to 10 with the radial type of inlet or supply as shown at 36 in FIGS. 2 and 3. However, the optimum value for this ratio has been found to be substantially 5. If the value is less than 3 the resistance of the inlet port is too great, with the result that the modulation range is too low. On the other hand, if this value exceeds 10 the efficiency of the vortex is impaired and again the modulation range becomes unuseful.

The ratio of the diameter of the vortex chamber $D_{ch}$ to the diameter of the outlet orifice $D_e$ should be substantially 5 for the vortex valve described above. A significant variation above or below this value results in a great reduction in the modulation range. A very small value of this ratio also increases the probability of hysteresis.

The optimum value of the ratio of the diameter of the vortex chamber $D_{ch}$ to the axial length of the vortex chamber at its minimum or center is approximately 4. If this ratio is less than 3, hysteresis usually occurs and if it is greater than 5 the modulation range is significantly reduced.

For the most linear performance and a high modulation range, the ratio of the radius of curvature of the side walls $R_w$ to the diameter of the vortex chamber $D_{ch}$ should be approximately 1.0. Although the exact effects of significant variations from this value have as yet been undetermined, the permissible range of this ratio appears to be about 0.6 to 1.2.

While the ratio of the area of the exit orifice to the area of the control ports does not appear to have a critical value, it does appear desirable to maintain this ratio in the range of 4 to 8. If the ratio is below this the pressure gain is high but the modulation range is low. And for higher ratios the pressure gain is low and the modulation range is high.

The radius on the converging portion of the outlet orifice $R_f$ to the outlet orifice diameter $D_e$ affects the modulation range of the vortex chamber and the performance of the receiver tube 52 and vent 60. The optimum value of the ratio $D_e/R_f$ is substantially 2. If the ratio is too small, linearity and modulation range suffer while a large ratio degrades modulation range and the vent performance.

The ratio of the length of the outlet $L_o$ to the diameter of the outlet orifice must be between 0.5 and 1.0 for optimum vent performance. If the valve is not vented, this ratio may vary by a large undetermined amount. The optimum vent and receiver performance occurs when the ratio of the axial spacing X between the outlet orifice 49 and the inlet of the receiver tube 52 to the diameter of the outlet orifice $D_e$ is between 0.5 and 0.7. If this ratio is less than 0.5 the required control pressure to turn off the valve is too high. If the ratio is more than 0.7, the power recovery is poor.

The optimum vent and receiver performance occurs when the ratio of the diameter of the receiver passage $D_r$ to the diameter of the exit orifice $D_e$ is in the range of 1.10 to 1.30. If the ratio is less than 1.1 the power recovery is poor. That is, if the receiver tube is too small a portion of the flow will miss the tube and pass out the vent. If the ratio is greater than 1.3 the power recovery is still poor and the control pressure required to turn off the valve is too great.

The angle alpha $\alpha$ of the external cone defining the conical surface 58 on the receiver tube is also critical and must be 30 degrees or less. If it is more than 30 degrees the valve is not easily turned off and oscillation sometimes may be produced.

I claim:
1. A vortex valve device for modulating fluid flow, comprising: a body having a generally annular vortex chamber with side walls and a pheripheral wall joining the side walls, supply port means for conveying supply fluid to said chamber, outlet port means from said chamber substantially in the center thereof for conveying fluids from said chamber, and control port means for selectively delivering control fluid having substantially the same viscosity as the supply fluid to said chamber at a relatively high velocity to mix with said supply fluid and create a vortex in the chamber, both of said side walls being geometrically curved and having a generally convex profile so that width of the chamber decreases toward the outlet port means to increase the range of modulation of the device,

2. A vortex device as defined in claim 1, wherein both of said side walls are geometrically curved and have a convex profile.

3. A vortex valve device as defined in claim 1, wherein said supply port means includes an axially extending passage in said body, fitting means on said body communicating with one end of said passage adapted to be connected to a source of supply fluid, said supply port means including a radially extending passage communicating with the other end of said axial passage and opening to the peripheral wall of said chamber whereby fluid flowing to said chamber through the supply port means has a reduced tendency to create any vortical flow in the chamber in the absence of control flow.

4. A vortex device as defined in claim 3, wherein said radial supply passage has an axial length substantially equal to the maximum length of said chamber.

5. A vortex device as defined in claim 2, wherein both of said side walls are truncated spheres.

6. A vortex device as defined in claim 5, wherein said radial supply passage has a radial length greater than the axial length thereof to assist in minimizing the vortex producing tendency of the supply port means.

7. A vortex valve device as defined in claim 5, wherein the ratio of radii of the truncated sphere side walls to the diameter of the chamber is in the range of 0.6 to 1.2.

8. A vortex valve device as defined in claim 7, wherein said ratio is substantially 1.

9. A vortex valve device as defined in claim 1, wherein the ratio of the diameter of the chamber to the minimum length of the chamber is in the range of 3 to 5.

10. A vortex valve device as defined in claim 9, wherein said ratio is substantially 4.

11. A vortex valve device for modulating fluid flow, comprising: a body having a generally annular vortex chamber with side walls and a peripheral wall joining the side walls, supply port means for conveying supplying fluid to said chamber, outlet port means in said chamber substantially in the center thereof for conveying fluid from said chamber, control port means for selectively delivering control fluid to said chamber at a relatively high velocity to mix with said supply fluid and create a vortex in the chamber, a receiver member in said body for receiving fluid from said outlet port means, abutment means for accurately spacing said receiver means from said outlet port means, and vent means in said body between said outlet port means and said receiver means, said receiver member and said vent means being positioned with respect to said outlet port means so that in the absence of control fluid flow the supply fluid will be recovered by said receiver means and in the presence of control fluid flow under a predetermined pressure at least a portion of the fluid entering the vortex chamber passes out the vent means, said body member having an integral axial extension defining at least in part said outlet port means, said receiver means including a threaded plug engaged in said body coaxially of said outlet port means, said abutment means including an annular flange on said plug engaging said integral extension, said vent means including a plurality of discrete converging holes in said integral extension the axes of which lie in a conical plane diverging away from said outlet port means.

12. A vortex valve device as defined in claim 11, wherein the end of the receiver plug adjacent the outlet port means has an outer surface lying in a conical plane the apex of which is less than 30 degrees to assure proper flow through the vent passages.

13. A vortex valve device as defined in claim 11, wherein said outlet port means is an axially extending cylindrical port in one of said side walls at the center of the vortex chamber, the ratio of the axial spacing between the end of the receiver plug and the outlet port to the diameter of the outlet port being in the range of 0.5 to 0.7 to reduce the control pressure required to reduce the receiver flow to zero and to assure high power recovery in the receiver means.

14. A vortex valve device for modulating fluid flow, comprising: a body having a generally annular vortex chamber with side walls and a peripheral wall joining the side walls supply port means for conveying supply fluid to said chamber, outlet port means in said chamber substantially in the center thereof for conveying fluid from said chamber, control port means for selectively delivering control fluid to said chamber at a relatively high velocity to mix with said supply fluid and create a vortex in the chamber, a receiver member in said body for receiving fluid from said outlet port means, abutment means for accurately spacing said receiver means from said outlet port means, and vent means in said body between said outlet port means and said receiver means, said receiver member and said vent means being positioned with respect to said outlet port means so that in the absence of control fluid flow the supply fluid will be recovered by said receiver means and in the presence of control fluid flow under a predetermined pressure at least a portion of the fluid entering the vortex chamber passes out the vent means, said body having an axially extending bore communicating with said outlet port means and with said vent means, said bore threadedly receiving said receiver plug, and an outlet plug adapted to replace said receiver plug when non-vented operation is desired, said receiver plug having means for blocking communication between said outlet port means and said vent passages.

15. A vortex valve device as defined in claim 14, wherein said outlet plug has a threaded portion adapted to be threaded into said body bore, an impervious annular portion on said outlet plug extending from the end thereof adjacent said outlet and engageable with one end of said bore to seal said vent passages.

16. A vortex valve device for modulating fluid flow, comprising: a body having a generally annular vortex chamber with side walls and a peripheral wall joining the side walls, supply port means for conveying supply fluid to said chamber, outlet port means in said chamber substantially in the center thereof for conveying fluid from said chamber, and control port means for selectively delivering control fluid to said chamber at a relatively high velocity to mix with said supply fluid and create a vortex in the chamber, said supply port means including a discrete axially extending passage in said body, fitting means on said body communicating with one end of said passage adapted to be connected to a source of supply fluid, said supply port means including a discrete radially extending passage communicating with the other end of said axial passage and opening to the peripheral wall of said chamber whereby fluid flowing to said chamber through the supply port means has a reduced tendency to create any vortical flow in the chamber in the absence of control flow, said radial supply passage having a radial length greater than the axial length thereof to assist in minimizing the vortex producing tendency of the supply port means.

17. A vortex valve device for modulating fluid flow, comprising: a body having a generally annular vortex chamber with side walls and a peripheral wall joining the side walls, supply port means for conveying supply fluid to said chamber, outlet port means in said chamber substantially in the center thereof for conveying fluid from said chamber, and control port means for selectively delivering control fluid to said chamber at a relatively high velocity to mix with said supply fluid and create a vortex in the chamber, said side walls being truncated spheres wherein the ratio of radii of the truncated sphere side walls to the diameter of the chamber is in the range of 0.6 to 1.2, said supply port means including a radially extending passage in said body opening to said vortex chamber and defining therewith a supply port having a predetermined area, the ratio of the area of the supply port to the area of the outlet port means being in the range of 3 to 10.

18. A vortex valve device for modulating fluid flow, comprising: a body having a generally annular vortex chamber with side walls and a peripheral wall joining the side walls, supply port means for conveying supply fluid to said chamber, outlet port means in said chamber substantially in the center thereof for conveying fluid from said chamber, and control port means for selectively delivering control fluid to said chamber at a relatively high velocity to mix with said supply fluid and create a vortex in the chamber, both of said side walls being truncated spheres, the ratio of radii of the truncated sphere side walls to the diameter of the chamber is in the range of 0.6 to 1.2, said outlet port means including a generally cylindrical opening in one of said side walls, the ratio of the diameter of the vortex chamber to the diameter of the outlet port being substantially 5.

19. A vortex valve device for modulating fluid flow, comprising: a body having a generally annular vortex chamber with side walls and a peripheral wall joining the side walls, supply port means for conveying supply fluid to said chamber, outlet port means in said chamber substantially in the center thereof for conveying fluid from said chamber, and control port means for selectively delivering control fluid to said chamber at a relatively high velocity to mix with said supply fluid and create a vortex in the chamber, both of said side walls being truncated spheres, the ratio of radii of the truncated sphere side walls to the diameter of the chamber is in the range of 0.6 to 1.2, the ratio of the diameter of the vortex chamber to the length of the vortex chamber being in the range of 3 to 5.

20. A vortex valve device for modulating fluid flow, comprising: a body having a generally annular vortex chamber with side walls and a peripheral wall joining the side walls; supply port means for conveying supply fluid to said chamber; outlet port means in said chamber substantially in the center thereof for conveying fluid from said chamber; control port means for selectively delivering control fluid to said chamber at a relatively high velocity to mix with said supply fluid and create a vortex in the chamber; both of said side walls being geometrically curved and having a generally convex profile so that length of the chamber decreases toward the outlet port means to increase the range of modulation of the device; said supply port means including an axially extending passage in said body, fitting means on said body communicating with one end of said passage adapted to be connected to a source of supply fluid, said supply port means including a radially extending passage communicating with the other end of said axial passage and opening to the peripheral wall of said chamber whereby fluid flowing to said chamber through the supply port means has a reduced tendency to create any vortical flow in the chamber in the absence of any control flow; a receiver member in said body for receiving fluid from said outlet port means, abutment means for accurately spacing said receiver member from said outlet port means; and vent means in said body between said outlet port means and said receiver member; said receiver member and said vent means being positioned with respect to said outlet port means so that in the absence of control fluid flow the supply fluid will be recovered by said receiver member and in the presence of control fluid flow at a predetermined pressure at least a portion of the fluid entering the vortex chamber passes out the vent means; said receiver member including a receiver plug; said outlet port means is an axially extending cylindrical port in one of said side walls at the center of the vortex chamber, the ratio of the axial spacing between the end of the receiver plug and the outlet port being in the range of 0.5 to 0.7 to reduce the control pressure required to reduce the receiver flow to zero and to assure high power recovery in the receiver means; said supply port means including a radially extending passage in said body opening to said vortex chamber and defining therewith a supply port having a predetermined area, the ratio of the area of the supply port to the area of the outlet port means being in the range of 3 to 10; said outlet port means including a generally cylindrical opening in one of said side walls, the ratio of the diameter of the vortex chamber to the diameter of the outlet port being substantially 5; said control port means including at least one port in said body extending tangentially with respect to said vortex chamber and communicating therewith adjacent the periphery of the chamber, the ratio of the area of the outlet port means to the area of the control port means being in the range of 4 to 8; the ratio of the length of the outlet port to the diameter of the outlet port being in the range of 0.5 to 1; said receiver member being spaced a predetermined distance from said outlet port means, the ratio of the space between the receiver member and the outlet port means to the diameter of the outlet port means being in the range of 0.5 to 0.7 to permit the use of lower control pressures while assuring high power recovery in said receiver member; said outlet means being defined by a first bore, said receiver means being defined by a second bore, the ratio of the diameter of the second bore to the diameter of the first bore being in the range of 1.10 to 1.30.

21. A double vortex valve unit, comprising: a central plate member, intermediate plates engaging each side of said central plate and each having a generally cylindrical opening therethrough, end plates engaging the sides of the intermediate plates opposite the central plate, means for rigidly connecting the plates together so that vortex chambers are defined between the central plate and each of the end plates, supply port means in at least two of said plates for delivering supply fluid to said chambers, tangential control port means in at least two of said plates for delivering control fluid tangentially into said chambers, and outlet ports in at least one of said plates for conveying fluid from said chambers.

22. A vortex device as defined in claim 21, wherein said supply port means, and said outlet ports are defined in said end plates, said control port means being formed in said intermediate plates.

23. A double vortex valve unit as defined in claim 21, wherein said end plates having spherical portions extending into the cylindrical openings in said intermediate plates, said central plate having spherical portions on both sides thereof extending into the cylindrical openings in said intermediate plates.

References Cited

UNITED STATES PATENTS

| | | | |
|---|---|---|---|
| 3,195,303 | 7/1965 | Widell | 137—81.5 XR |
| 3,219,048 | 11/1965 | Palmisano | 137—81.5 |
| 3,267,946 | 8/1966 | Adams et al. | 137—81.5 |
| 3,290,947 | 12/1966 | Reilly | 137—81.5 |
| 3,320,815 | 5/1967 | Bowles | 73—505 |
| 3,324,891 | 6/1967 | Rhoades | 137—815 XR |
| 3,336,931 | 8/1967 | Fox et al. | 137—815 |
| 3,343,790 | 9/1967 | Bowles | 137—815 XR |
| 3,351,080 | 11/1967 | Datwyler et al. | 73—505 XR |
| 3,368,577 | 2/1968 | Otsap | 137—81.5 |
| 3,334,657 | 8/1967 | Smith et al. | 137—604 |

SAMUEL SCOTT, Primary Examiner